United States Patent [19]

Chapa, III

[11] 4,041,681
[45] Aug. 16, 1977

[54] CORN DETASSELER

[76] Inventor: Lucio Chapa, III, 1229 Monroe Ave., Ottumwa, Iowa 52501

[21] Appl. No.: 683,700

[22] Filed: May 6, 1976

[51] Int. Cl.² .......................................... A01D 45/02
[52] U.S. Cl. ..................................................... 56/63
[58] Field of Search ............................. 56/53, 56–59, 56/63, 27.5

[56] References Cited

U.S. PATENT DOCUMENTS

| | | | |
|---|---|---|---|
| 3,662,526 | 5/1972 | Smith | 56/63 |
| 3,712,035 | 1/1973 | Gildersleeve | 56/63 |
| 3,769,783 | 11/1973 | Meharry | 56/63 |

Primary Examiner—Russell R. Kinsey
Attorney, Agent, or Firm—Morton S. Adler

[57] ABSTRACT

Apparatus for detasseling corn includes a plurality of spaced tassel severing stations each at a predetermined different height and associated with guide or deflector means to discriminate between corn stalks of different heights so as to guide such stalks into the appropriate tassel severing station as the apparatus moves through a row of corn.

12 Claims, 9 Drawing Figures

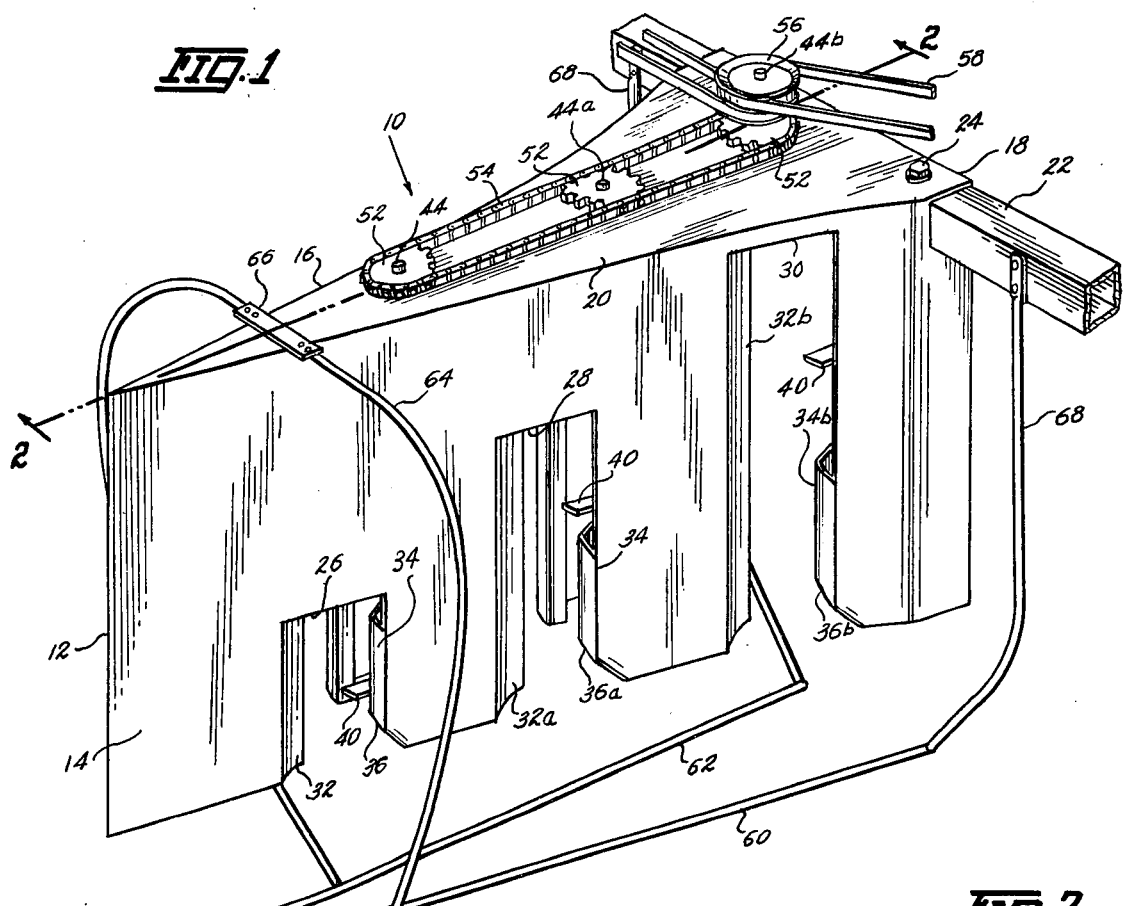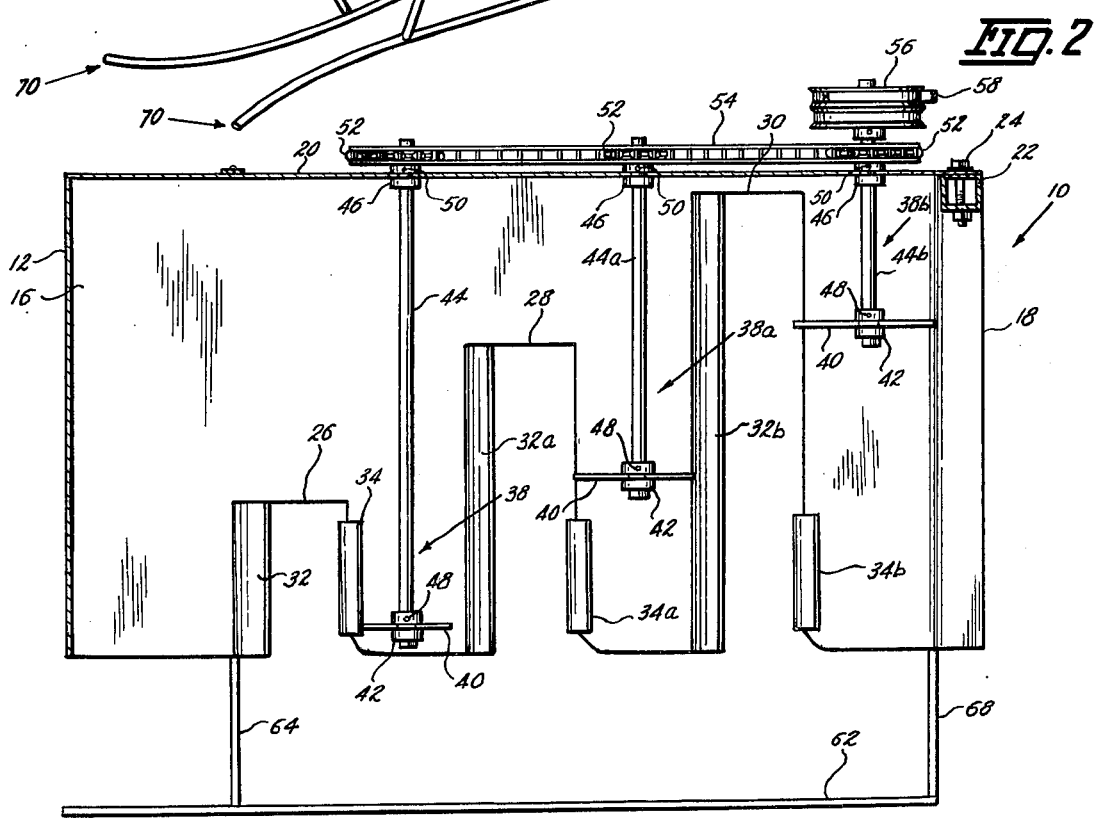

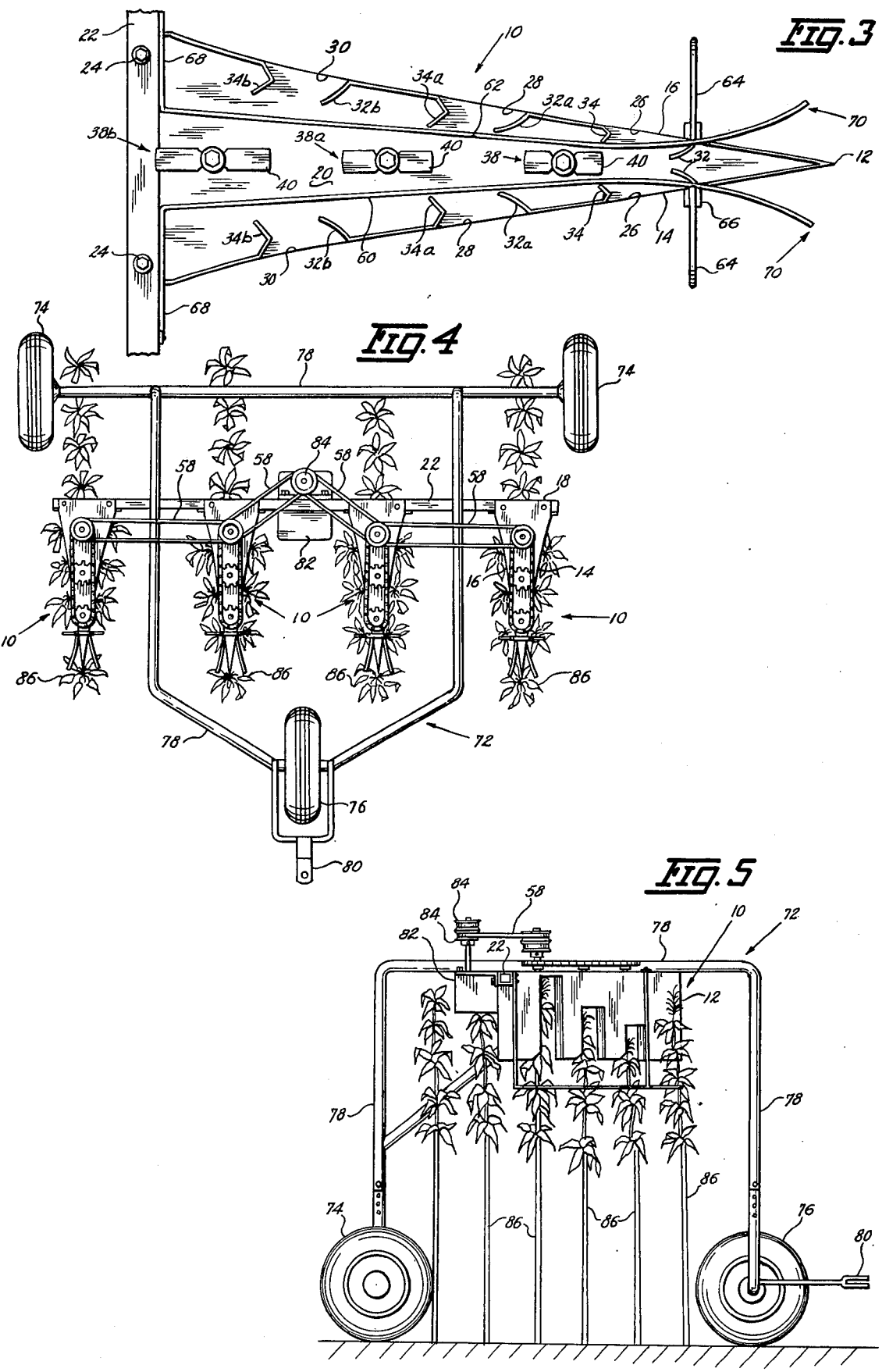

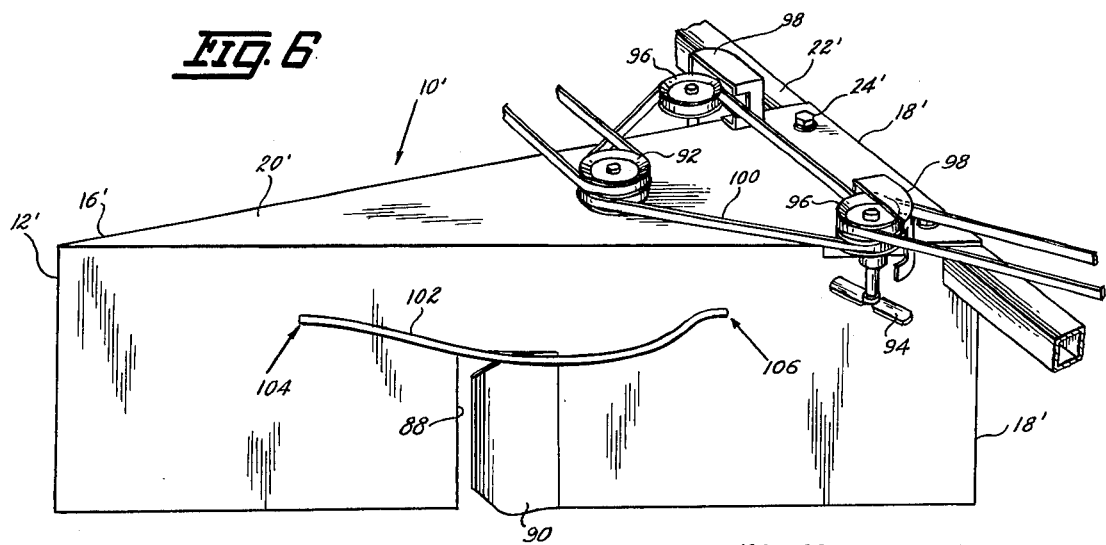
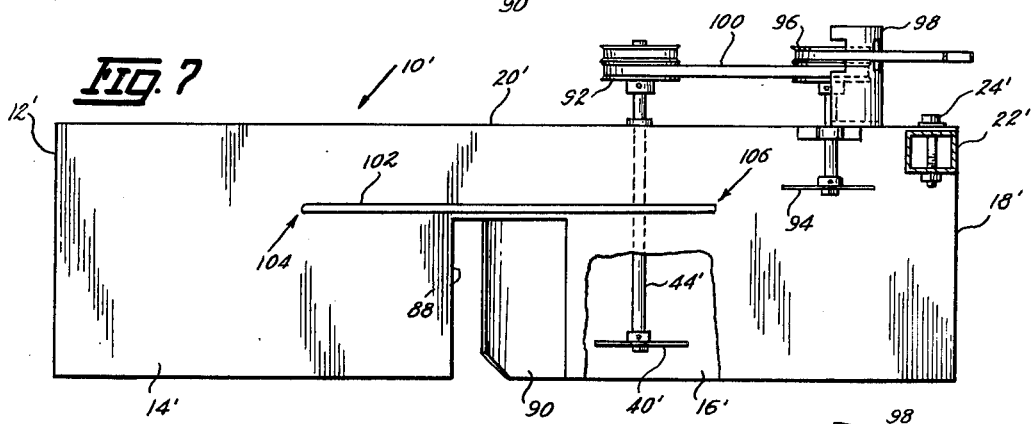
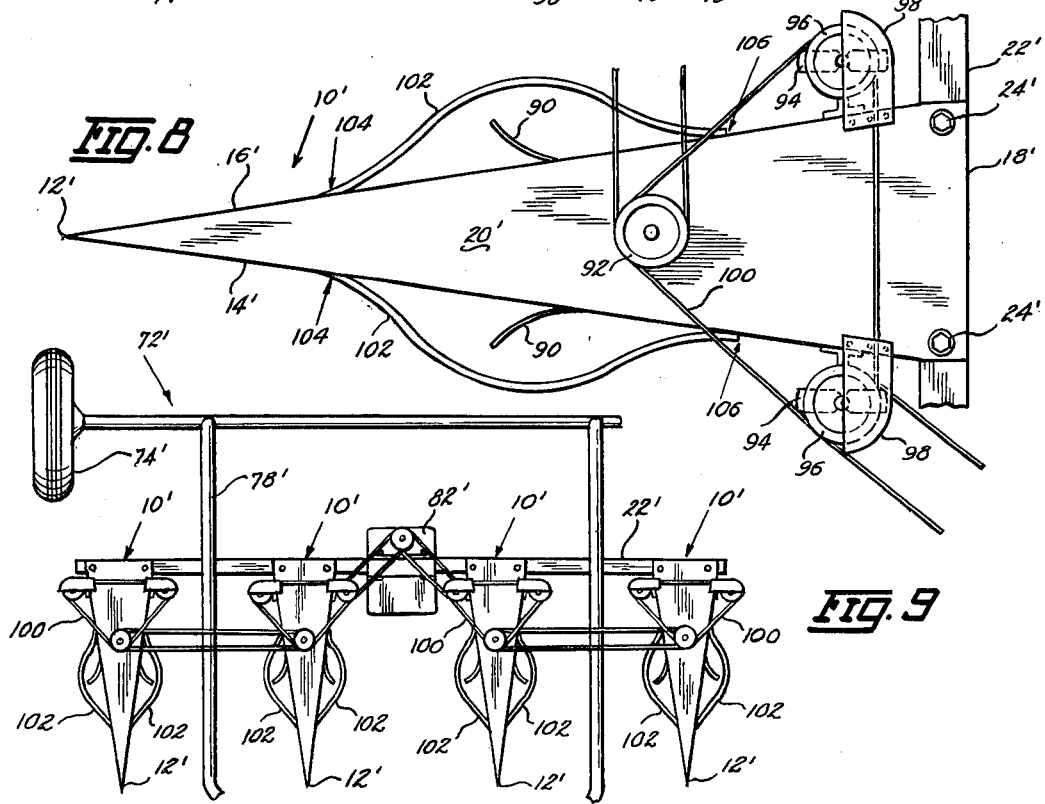

CORN DETASSELER

BACKGROUND ON THE INVENTION

This invention relates to improvements in corn detasseling apparatus and more particularly to such an apparatus capable of acting separately on corn stalks of different heights to remove the tassels therefrom as the apparatus moves through a field of rows of corn.

The process of developing hybrid corn, as is well known, involves the crossing of severaal varieties to obtain the best characteristics of each and this requires removing the tassels from the top of certain rows of corn stalks prior to the release of pollen so that pollination with the desired varieties can be achieved. In this regard, it is desirable that the detasseling remove only a minimum amount of the leaves for the untimely and unnecessary leaf removal and resulting plant damage adversely affects the corn yield and quality.

The manual method of removing tassels from each stalk is widely used and generally results in a minimum of plant damage but such method is time consuming, expensive, involves personnel problems and becomes a serious economic consideration when large scale plantings must be detasseled. Accordingly, several mechanical corn detasseling machines have been developed which include the two general types of "pullers" as seen in U.S. Pat. Nos. 3,712,035 and 3,855,761 and "cutters" exemplified in U.S. Pat. Nos. 3,025,653 and 3,717,982. Each type has both advantages and disadvantages in the the "pullers" appear to cause less damage to the leaves but tend to plug or slip when the plants are wet and the "cutters" operate faster but result at times in more plant damage so that the type used with the present invention can be a matter of choice. Both types, however, are, for all practical purposes, designed for and limited to removing tassels at a given height and since corn stalks grow to different heights due to the different sizes of the plants, present mechanical detasselers are not able to remove the tassels on short stalks without seriously harming the taller plants. Mechanical detasselers are thus usually directed toward the taller stalks leaving in most instances a substantial number of short stalks which require a manual clean-up involving added time and expense.

U.S. Pat. No. 3,712,035 treats the problem of detasseling tall and short stalks by vertically spaced tassel severing means to make cuts on the respective short and tall stalks at appropriate places but since with this device all stalks must travel the same path, unnecessary portions of the taller stalks are severed by the lower cutter and only lower outcropping of leaves are left. In U.S. Pat. No. 3,855,761, a vertical adjustment of the device is provided to meet the height variation but if adjusted for the shorter stalks, the damage to the taller stalks is unavoidable.

With the above observations in mind, it is one of the important objects of the present invention to provide a corn detasseling apparatus capable of discriminating between tall and short plants within predetermined limits and to effect the removal of the tassels at the respective heights without the detasseling at one height having any effect on a tassel or plant of a different height.

More particularly, it is an object of this invention to provide a corn detasseler of the above class which includes a plurality of spaced tassel severing stations disposed at different predetermined height ranges and associated with a guide or deflector device to discriminate between corn stalks of different height ranges and to guide such stalks into the appropriate tassel severing station as such detasseler moves through a field of rows of corn.

Another object is to provide a corn detasseler as characterized which may be mounted to various types of available farm equipment for towing or self propulsion along rows of corn.

A further object is to provide such a detasseler adaptable for arrangement in a gang formation for multiple row operation.

Still another object of this invention is to provide a corn detasseling apparatus designed to efficiently remove substantially all tassels of varying heights in a row of corn with a minimum of plant damage and to minimize if not eliminate, any necessity for a manual clean-up operation.

The foregoing objects and such further objects as may appear herein, or be hereinafter pointed, together with the advantages of this invention will be more fully discussed and developed in the more detailed description of the accompanying drawings.

BRIEF DESCRIPTION OF THE DRAWINGS

FIG. 1 is a perspective view of one embodiment of this new corn detasseler,

FIG. 2 is a sectional view taken on the line 2—2 of FIG. 1,

FIG. 3 is a bottom plan view of the detasseler in FIG. 1,

FIG. 4 is a top plan view illustrating a gang arrangement of this corn detasseler mounted on a suitable mobile chassis, FIG. 5 is a schematic side elevational view of this detasseler being moved along a row of corn stalks, FIG. 6 is a perspective view of a second embodiment of this invention, FIG. 7 is a side elevational view of the device in FIG. 6 partially broken away and partially in section, FIG. 8 is a top plan view of the device in FIG. 6, and FIG. 9 is a top plan view illustrating a gang arrangement for the device in FIG. 6.

DESCRIPTION OF THE PREFERRED EMBODIMENTS

Referring to the drawings, the principal embodiment of this invention is designated generally by the numeral 10 as best seen in FIG. 1 and comprises a wedge shaped body defined by the forward or leading apex end 12 from which the respective sides 14 and 16 extend rearwardly in arcuate diverging paths to the rear or trailing edge 18. A wedge shaped top 20 is connected to the top edges of sides 14 and 16 and a transversely disposed support bar 22 is secured to the rear edge 18 just below top 20 by suitable bolt means 24 as best seen in FIG. 2. The bottom and rear side of detasseler 10 are open and while member 10 may be made from any suitable material, I have preferably used sheet metal for overall lightness and economy in manufacture as will be apparent. Also, the general size may be varied as desired but for purposes of illustration, I have made the height of the sides 25 inches, the length between edges 12 and 18 48 inches and the distance between sides 14 and 16 at the rear edge 18 at 16 inches.

On each of the sides 14 and 16, there is formed a plurality of longitudinally spaced and correspondingly opposed openings or passageway designated respectively 26, 28 and 30, it being noted that each of these openings extend upwardly from the bottom edge of sides 14 and 16 and that each opening is progressively higher from the shortest opening 26 closest to the leading edge 12 to the tallest opening 30 near the trailing edge 18. Openings 26, 28 and 30 may be conveniently formed in the sheet metal sides by well known punch die procedure so as to form the inwardly and rearwardly extending respective concave baffle or deflector 32, 32a and 32b at the forward edge of each opening 26, 28 and 30 and the similarly arranged respective convex baffle or deflector 34, 34a and 34b on the rear edge of each opening with the bottom edge of baffles 34, 34a and 34b being curved upwardly and inwardly 36, 36a and 36b as best seen in FIG. 1

Thus far described and as seen in FIG. 3, the like sized respective pairs of openings 26, 28 and 30 on sides 14 and 16 are oppositely disposed to each other and a suitable separate tassel severing device designated generally by the numerals 38, 38a and 38b is disposed within member 10 so that the respective devices 38, 38a and 38b are located substantially intermediate the respective rear baffles of deflectors 34, 34a and 34b on each pair of opposed openings 26, 28 and 30. No invention is claimed here for devices 38, 38a and 38b per se and any one of several tassel severing devices available may be suitably employed. However, in relation to openings 26, 28 and 30 and for purposes of illustration, I have used a like horizontal cutting blade 40 mounted by a fitting 42 to the lower end of the respective shafts 44, 44a and 44b of which the upper end is mounted to a fitting 46 secured to top 20. The respective shafts 44, 44a and 44b for openings 26, 28 and 30 are progressively shorter in length from the longest shaft relative to openings 26 to the shortest shaft relative to opening 30 whereby the plane of the respective blades 40 relative to ground level is progressively higher from openings 26 to openings 30 as best seen in FIG. 2. It is also noted that the relative height position of any blade 40 can be varied, if desired, by either adjusting the set screw 48 attached to fitting 42 on shafts 44, 44a and 44b or adjusting said shafts in the set screw 50 attached fitting 46 in a well known manner. On top 20, each fitting 46 carries a sprocket 52 which is engaged by the endless chain 54 and over the rearmost sprocket 54, a pulley 56 is secured to the top of shaft 44b for connection to a drive belt 58 whereby rotation of pulley 56 effects the rotation of all blades 40.

A pair of corn stalk guide rods 60 and 62 are disposed in spaced relationship below device 10 as best seen in FIGS. 1 and 3 where they are supported near their forward ends by the bail-like rod 64 secured to a plate 66 on top 20 and at their rearward ends by the rods 68 depending from bar 22. Rods 60 and 62 are in lateral spaced relationship to each other extending generally from the leading edge 12 of device 10 to the rearward edge 18 and, as shown, the forward ends 70 of rods 60 and 62 diverge in an arcuate path away from apex end 12 with the length of each rod 60 and 62 extending toward edge 18 in a substantially parallel plane to a respective side 14 and 16 so that the distance between rods 60 and 62 becomes progressively greater from openings 26 to openings 28 and 30.

Detasseler 10 as thus far described may be used individually but is preferably used in a gang arrangement to detessel several rows of corn at a time in a well known manner and such a gang is illustrated in FIGS. 4 and 5 as follows. The support vehicle 72 is illustrative of a well known type used for detasseling equipment for which no invention is claimed per se and to which device 10 can be readily adapted. Vehicle 72 includes widely spaced rear wheels 74 and a forward wheel 76 supported by a relatively high frame structure 78 whereby the wheels are spaced to move between rows of corn and frame 78 is high enough to generally clear the top of the stalks and vehicle 72 may be of a self-propelled type or towed by hitch 80 all as is well known.

In FIG. 4, it is seen that four detasselers 10 are mounted in spaced relationship to a support bar 22 suitably mounted on frame 78 of vehicle 72. A drive means 82 on bar 22 includes a shaft with double pulley 84 which is connected to the various pulleys 56 by the arrangement of belts 58 as shown. Drive means 82 may be a self operating motor or engine or may be powered from a tractor vehicle in any well known manner and the details of any such system may be a matter of choice with this invention.

In the operation of detasseler 10 as described, it will be understood the spacing of the detasselers as shown in FIG. 4 is such that each member 10 is positioned to move along a row of corn according to the usual spacing of such rows. As this occurs, the corn stalks 86 will contact either side 14 or 16 at apex end 12 so as to normally slide against such sides. This will normally occur for all generally upstanding stalks but those stalks which may be more in an inclined position or bent, for which there are often many, will be engaged by the diverging ends 70 of rods 60 and 62 and guided towards sides 14 or 16. Thus, as detasseler 10 is moved forwardly, the shorter stalks will pass into openings 26 where the tassels will be severed by blade 40. Stalks too tall to enter opening 26 will move past such opening for which purpose the convex surface of rear baffle 34 with the bottom curve 36 expedites such passage by eliminating and edges to snag such stalks. Stalks with the height factor of openings 28 enter the same for contact with cutter 40 therein and the tallest stalks will similarly enter openings 30. By this arrangement, it will be appreciated that tassels of different heights are removed during movement of this device and the cutting action on the tassels of the tall stalks does not interfer with nor effect the cutting of the tassels on the shorter stalks. With the shorter tassels being cut first, the stalks pass between rods 60 and 62 out of the back of the detasseler 10 and the successive cutters 40 are high enough that they do not contact the stalks already detasseled. There is thus provided a detasseling device by which corn stalks within a plurality of height ranges can be efficiently detasseled in one operation and while such height ranges may not encompass every stalk that might be encountered, it will include substantially all of them so that a separate manual clean-up will be of minor consideration, if at all. While the height ranges of cutters 40 may be varied as described, I have for purposes of illustration placed the respective cutters 40 in openings 26, 28 and 30 at the respective heights from ground level of 5½ feet, 7 feet and 8½ feet.

With reference now to FIGS. 6–8, I have shown a second embodiment of this invention designated 10' and wherein like parts are given like numerals primed.

Detasseler 10' has a wedge shaped body as in 10 which includes the front apex end 12', the sides 14' and 16', the rear edge 18', the top 20' and the support bar 22' at the rear below top 20' secured by bolt 24'. Detasseler 10' is designed for removing tassels in two selected height ranges and for this purpose, like openings 88 are provided in sides 14' and 16' approximately midway between edges 12' and 18' and communicate with the bottom of sides 14' and 16'. An outwardly flared baffle 90 extends from the rear edge of each opening 88 and such openings 88 serve as passageways similar to openings 26, 28 and 30 in detasseler 10. A cutter blade 40' on a shaft 44' is mounted relative to openings 88 the same as blades 40 previously describe and includes the double pulley 92 on top 20'. At the rear of each side 14' and 16' a shaft mounted cutter blade 94 is disposed exteriorly of such side at a predetermined height above the plane of blade 40' and is secured to a pulley unit 96 mounted on top 20' and protected by a shield 98 also mounted on said top. An endless belt 100 connects pulleys 92 and 96.

On each side 14' and 16' there is secured a corn stalk deflector or guide rod 102 which extends from a point 104 forwardly of opening 88 rearwardly and outwardly in a curved path in spaced relationship past baffle 90 on a plane just below the top of opening 88 and then inwardly for attachment to sides 14' and 16' at point 106 rearwardly of opening 88.

Detasseler 10' may be used in a gang arrangement similar to detasseler 10 as shown in FIG. 9 where like parts are given like numerals primed and the various belts 100 are connected to drive unit 82' in an obvious manner.

In the operation of detasseler 10' as it is moved along rows of corn, the stalks will slide against 14' and 16' as with detasseler 10 and stalks shorter than the top of openings 88 will enter the same for severance of the tassels by cutter 40'. Stalks taller than guide rods 102 will be guided outwardly around baffles 90 into the rear portions of sides 14' and 16' where they will pass by cutters 94 for removaal of the tassels and thus the stalks within the two height ranges selected will have their tassels removed in a single pass of detasseler 10' without the cutting action on the stalks in one height range being affected by the cutting action on the stalks in the other height range. Accordingly, in view of the foregoing, it is thought a full understanding of the construction and operation of this invention will be had and the advantages of the same will be appreciated.

I claim:

1. Apparatus for removing tassels from corn stalks, comprising:
    a body member having a leading and trailing edge, a closed top, vertical sides, an open bottom and an open rear side for movement over a row of corn stalks having tassels thereon,
    a plurality of tassel severing means operably mounted to and within said body member in spaced relationship between said leading and trailing edges,
    the plane of operation of said respective tassel severing means being progressively higher from said leading edge to said trailing edge,
    a respective passageway of a predetermined height range in said body member associated with each respective tassel severing means, and
    the height ranges of said passageways being progressively greater from said leading edge to said trailing edge whereby as said body member is moved over a row of corn stalks short stalks within the height range of the first encountered passageway will enter the same for contact with the tassel severing means therein and progressively taller stalks will enter successive passageways according to their relationship to the respective height ranges encountered.

2. Apparatus as defined in claim 1 including means to selectively adjust the plane of operation of said tassel severing means.

3. Apparatus for removing tassels from corn stalks, comprising:
    a wedge-shaped body member having a leading apex edge, a relatively wide trailing edge, opposed vertical sides each extending from said leading edge in curved diverging paths to respective ends of said trailing edge, a top connecting said sides and an open bottom and open rear side,
    a plurality of corresponding opposed openings in each side in spaced relationship between said leading and trailing edges,
    each of said openings communicating with the bottom of said respective sides and the height of said openings being progressively greater from said leading edge to said trailing edge,
    a respective tassel severing device mounted within said body member in association with each pair of opposed openings in said sides,
    the plane of operation of each tassel severing device being progressively higher from said leading edge to said trailing edge,
    means for moving said body member over a row of corn stalks having tassels thereon, and
    means on said body member for operating said tassel severing devices.

4. Apparatus as defined in claim 3 including:
    a pair of corn stalk guide rods disposed in spaced relalationship below said body member,
    said guide rods having diverging forward ends disposed at opposite sides of said leading edge in spaced relationship thereto and extending therefrom toward said trailing edge in a curved path generally parallel to the curvature of said sides, and
    means on said body member for supporting said guide rods.

5. Apparatus as defined in claim 3 including:
    each of said openings having a front edge and a rear edge,
    a concave baffle on the front edge of each opening extending into the interior of said body member, and
    a convex baffle on the rear edge of each opening extending into the interior of said body member.

6. Apparatus as defined in claim 3 including each tassel severing device comprising:
    a respective vertical shaft operatively secured at its upper end to said top for rotaion about its longitudinal axis so that a respective shafts depends within said body member in association with an opposed pair of openings,
    a horizontally rotatable cutter blade on the lower end of shaft,
    drive means on said body member operatively connected to the top end of each shaft for rotating the same, and
    the length of said shafts being progressively longer from said trailing edge to said leading edge whereby the plane of said cutter blades are progressively higher from said leading edge to said trailing edge.

7. Apparatus as defined in claim 6 including means for adjusting the respective plane of operation of each cutter blade.

8. Apparatus for removing tassels from corn stalks, comprising:

a body member having a leading and trailing edge, a closed top, vertical sides, an open bottom and an open rear side for movement over a row of corn stalks having tassels thereon, a respective forward and rearward tassel severing means on said body member intermediate said leading and trailing edges, the plane of operation of said rearward tassel severing means being higher than the plane of operation of said forward tassel severing means, and a corn stalk guide rod on said body member at a predetermined height embracing said forward tassel severing means whereby as said body member is moved over a row of corn stalks, stalks shorter than the height range of said guide rod will be contacted by said forward tassel severing means for tassel removal and stalks taller than said guide rod will be deflected thereby around said forward tassel severing means into contact with said rearward tassel severing means for tassel removal.

9. Apparatus as defined in claim 8 including: said forward station comprising:

said body member provided with an opening having a front and rear edge, a baffle extending outwardly and forwardly from said rear edge, a shaft mounted horizontally rotatable cutter blade disposed within said body member adjacent said opening, and said shaft being operably suspended from said top, said rearward station comprising:

a second horizontally rotatable cutter blade operably mounted on said body member for rotation near said trailing edge in spaced relationship outwardly from said body member, drive means on said body member operably connected to said shaft and said second cutter blade, and the plane of operation of said cutter blade at said rearward station being higher than the plane of operation of said cutter blade at said forward station.

10. Apparatus for removing tassels from corn stalks, comprising:

a plurality of tassel severing means, means for supporting said tassel severing means so that they are disposed in spaced longitudinal alignment defining a leading end and a trailing end, the plane of operation of said respective tassel severing means being progressively higher from said leading end to said trailing end, and corn stalk guide means operably associated with said tassel severing means whereby as said tassel severing means are moved over a row of corn stalks, short stalks within the height range of the first encountered tassel severing means being directed by said guide means into contact therewith for tassel removal and progressively taller corn stalks will be similarly acted upon by said guide means according to their height relationship to successively encountered tassel severing means.

11. Apparatus as defined in claim 10 including means to selectively adjust the plane of operation of said tassel severing means.

12. Apparatus as defined in claim 10 wherein said means for supporting said tassel severing means includes means for moving said tassel severing means over a row of corn stalks and means for operating said tassel severing means.

* * * * *